Dec. 6, 1966 H. RÖSSLE ETAL 3,290,566
STACKABLE SEMICONDUCTOR RECTIFIER ELEMENT HAVING
SEALS UNDER COMPRESSIVE STRESS
Filed Sept. 24, 1964 2 Sheets-Sheet 1

INVENTORS
HEINZ RÖSSLE
KARL-HEINZ KASPER
HORST RUMLER
BY Percy P. Lantzy
ATTORNEY

INVENTORS
HEINZ RÖSSLE
KARL-HEINZ KASPER
HORST RUMLER

BY [signature]
ATTORNEY

United States Patent Office 3,290,566

Patented Dec. 6, 1966

3,290,566
STACKABLE SEMICONDUCTOR RECTIFIER ELEMENT HAVING SEALS UNDER COMPRESSIVE STRESS

Heinz Rössle, Schnaittach, Karl-Heinz Kasper, Nurnberg, and Horst Rumler, Cologne, Germany, assignors to International Standard Electric Corporation, New York, N.Y., a corporation of Delaware Filed Sept. 24, 1964, Ser. No. 402,982
Claims priority, application Germany, Sept. 28, 1963, St 21,126
8 Claims. (Cl. 317—234)

The present invention relates to semiconductor power rectifier arrangement, and more particularly to an improved structure wherein the semiconductor is positioned in an annular insulator layer or ring.

It has been suggested in the prior art that the mounting structure such as carrier bolts and supporting frames, generally used to secure metallic rectifier plates, may also accommodate semiconductor elements within the annular layers of the device. For example, the solid metal spacing and contact member used in a selenium rectifier stack may serve as a support for a semiconductor device, such as a silicon rectifier. According to prior application Serial No. 281,873, filed May 21, 1963 and assigned to the same assignee as the instant case, a metal ring electrode has an eccentric hole which accommodates a power rectifier. In another annular rectifier of this type, as described in copending application No. 295,331, filed July 16, 1963, and similarly assigned to the same assignee, the power rectifier is accommodated in an eccentric cavity or hollow space of an insulating ring covered on both sides by corresponding metal plates which serve as the electrode connections. The same structure may also accommodate several such power rectifiers (in common or separate holes). The connection of the individual elements of the annular rectifier is preferably effected by soldering the metallic plates or rings to a metallized layer on the face side of the enclosed ring of insulating material. However, due to cooling or solidification of the solder, and changes in temperature, during operation of the rectifiers, the solder layers are subjected to tangential or shearing stresses which may cause the housing of the structure to loosen or become leaky.

It is therefore the object of the present invention to provide a structure that will utilize compressive stresses to ensure a more reliable seal while eliminating the shearing stresses. Accordingly, the novelty of the invention resides in the fact that the structure is designed in such a way, that the sealing or soldering connections are made at points where the stresses are largely of the compressive type.

This result may be achieved in several different ways, some examples of which will be explained more fully with reference to the accompanying drawings wherein FIGS. 1–5 show various embodiments.

Figure 1:
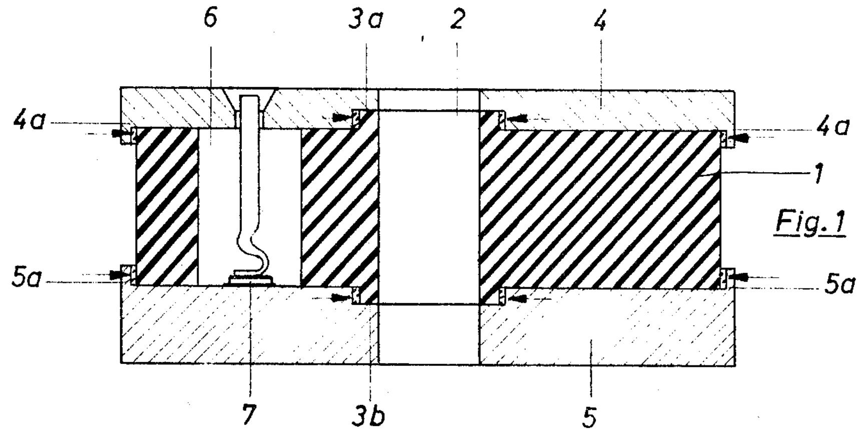

FIG. 1 shows a ring of insulating material 1 around the central mounting hole 2 provided with stud-like projections *3a* and *3b* respectively at both sides of the area adjacent the hole. These projections engage the metallic covering rings 4 and 5 respectively which, in this case, are in the form of plates with recessed portions matching the projections, and are adapted to serve as electrodes. The rings 4 and 5 are cup-shaped around the periphery and enclose the ring of insulating material 1 with lip portions *4a* and *5a* respectively. The soldering connections extending all around the cup, between the ring of insulatng material 1 and the covering rings 4 and 5 are applied at the points indicated by the arrows and by the thick black areas in the drawing. Thus, upon cooling or solidification of the solder, only compressive stresses will occur, as indicated by the same arrows. The power rectifier 7 is arranged in one hole 6 passing through the ring of insulating material 1, with one electrode in electrical contact with covering ring 4 at one side and the other electrode in contact with ring 5 at the other side of the structure.

Figure 2:
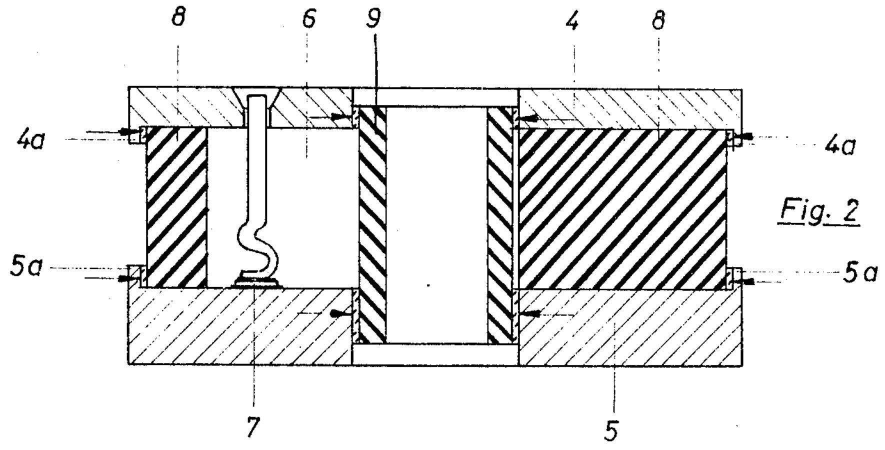

FIG. 2 deviates from the embodiment of FIG. 1 in that the single ring of insulating material 1 is replaced by two portions including an outer ring of insulating material 8, and an inner insulating tubing 9. A hole 6 provided in the ring of insulating material 8, is adapted to receive both the insulating tubing 9 and the power rectifier 7. As in FIG. 1, the points at which the soldering connections are located, are indicated by thick black portions, with the arrows indicating that substantially only compressive stresses can occur. In this embodiment the insulating tubing 9 takes over the functions of the central hole 2 shown in FIG. 1. A bolt through the hole 2 or the insulating tubing 9, permits the stacking of a plurality of such structures.

Figures 3, 4, 5:
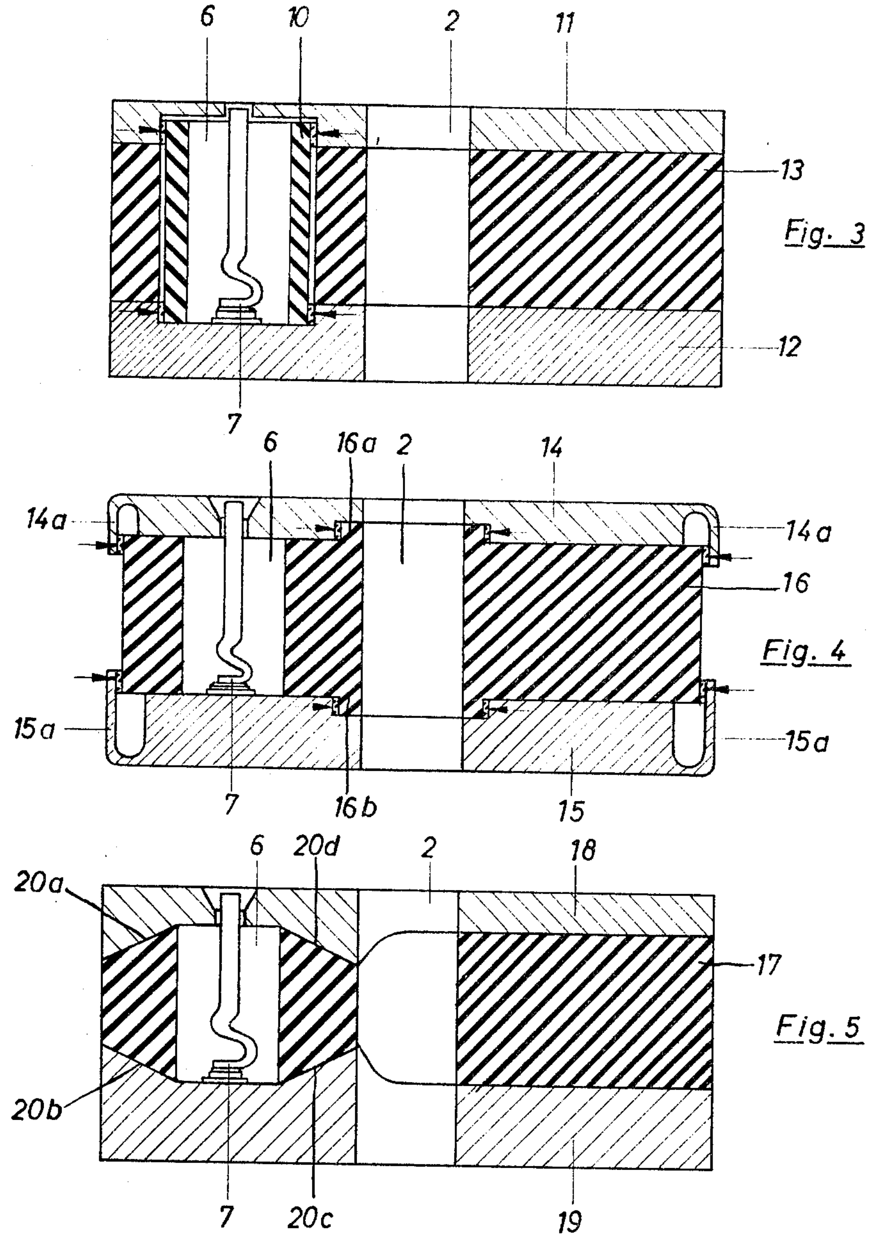

FIG. 3 shows a modified embodiment of the invention in which the centrally arranged insulating tubing 9 of FIG. 2 is positioned eccentrically, as indicated by reference numeral 10. The spacing between the metal cover plates 11 and 12 is effected by a ring of insulating material 13 which, is again provided with a central hole 2 for stacking additional units or for mounting the structure. A further hole 6 receives the insulating tubing 10. The top and bottom of the periphery of tube 10 are soldered to the rings 11 and 12 which have mating recessed areas.

If it is desired to arrange several rectifiers in the manner of FIG. 3, the ring of insulating material 13 may, in some cases, be completely omitted. In this instance care should be taken to provide a symmetrical distribution of the rectifiers around the structure.

In another variation of the form of FIGS. 1 and 2, the covering rings may be designed as shown in FIG. 4, with a hollow lip-portion 14*a* and 15*a* of the rings 14 or 15 respectively, being formed of extensions which are crimped over the ends. In this way the edges of the ring of insulating material 16 may retain their shape under compressive stress without distortion caused by the covering ring being forced off the ring of insulating material.

It is also within the scope of the present invention, to achieve a certain relationship between the compressive stress and the shearing stress, which may be adapted to specific requirements. This is shown in FIG. 5 in which reference numeral 17 indicates the ring of insulating material and numerals 18 and 19 indicate the covering rings. The common center hole is indicated by reference numeral 2. The power rectifier 7 is positioned in an eccentric hole 6 provided in ring 17. The position of the conical soldering surfaces 20*a*, 20*b*, 20*c*, and 20*d* determines the relationship between the compressive and the shearing stress. The steeper the inclined surfaces of the insulating ring, which engage corresponding conical recesses in the covering plates, the greater will become the relationship of the compressive stress to the shearing stress. In the extreme case, the connecting surfaces extend vertically to form the structure as shown in FIG. 1, wherein, the chief stresses existing are substantially those of the compressive type. Adjustment of the relationship between the compressive and the shearing stress may also be applied to the other examples mentioned above.

The invention is in no way restricted to the formation of connections between individual components of the structure by way of soldering. The soldering connections may just as well be replaced by a cement connection, or the like. This is due to the fact that the heating of the semiconductor progresses from the inside to the outside, so that compressive stresses prevail thus ensuring a reliable connection of the individual elements of the structure.

Similarly, the invention is not restricted to the use of annular or ring-shaped composite structures, but may also be applied to arrangements of plates or bodies without a central mounting hole. These types may be held in position by an insulating frame, or other suitable support.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A semiconductor mounting device comprising an insulator body, a pair of conductive plates secured on each side of said insulator, a first hole extending axially completely through said insulator from one said side to the other between said plates, a semiconductor element positioned in said first hole and having one electrode connected to one plate and another electrode to the other plate, each side of said insulator having a longitudinal projection extending from the outer surface of the insulator body into and engaging a mating recess in each said plate, and a layer of sealing material extending about the peripheral edges of said projection between the laterally engaging portions of said plates and insulator projection within said recess.

2. The device of claim 1 including a central mounting hole through said insulator body and conductive plates, said first hole being eccentrically positioned from said central hole.

3. The device of claim 2 including lipped portions around the outer edges of said conductive plates formed over and engaging the outer edges of said insulator body, and a layer of sealing material between said lipped portions and insulator.

4. The device of claim 2 wherein said projection is positioned about the peripheral edge of said central hole.

5. A device of claim 2 wherein said projection is positioned about the peripheral edge of said eccentric hole.

6. The device of claim 2 wherein said projection extending from said insulator body includes a separate inner insulating tube.

7. The device of claim 2 wherein said projection and recesses are in the form of inclined mating surfaces having said sealing layer therebetween, the maximum extension of the projection being at a central position.

8. The device of claim 2 wherein said insulator body and conductive plates are in the form of an annular ring.

References Cited by the Examiner

UNITED STATES PATENTS

| | | | |
|---|---|---|---|
| 2,861,227 | 11/1958 | Scherbaum | 317—234 |
| 2,986,679 | 5/1961 | Storsand | 317—234 |
| 3,110,080 | 11/1963 | Boyer et al. | |

FOREIGN PATENTS

| | | |
|---|---|---|
| 1,031,439 | 3/1953 | France. |

JOHN W. HUCKERT, *Primary Examiner.*

A. M. LESNIAK, *Assistant Examiner.*